Sept. 30, 1924.
B. FORBES
BELT CONVEYER
Filed May 29, 1922
1,510,051
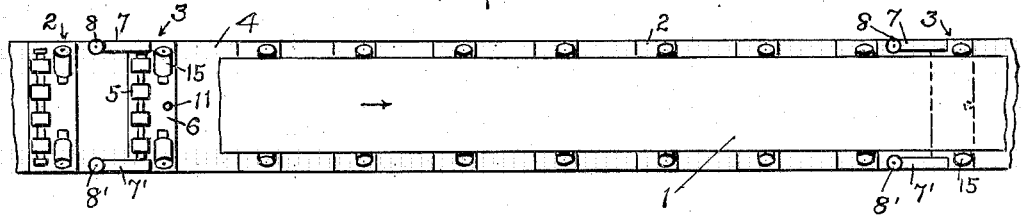
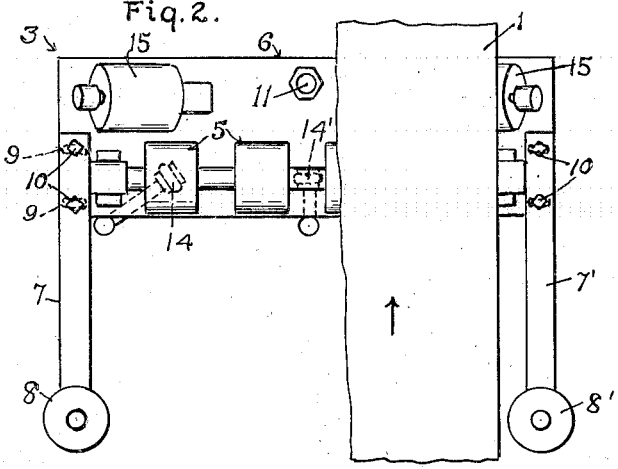
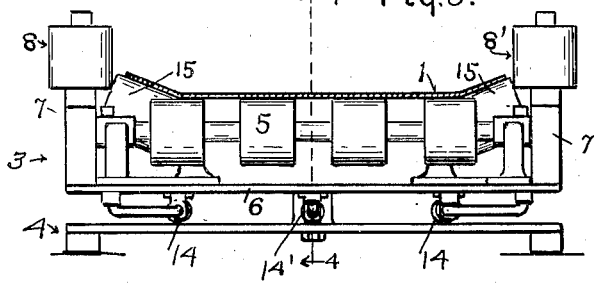
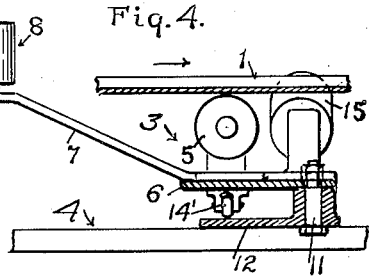
INVENTOR.
Byron Forbes
BY Arthur P. Knight
ATTORNEY.

Patented Sept. 30, 1924.

1,510,051

UNITED STATES PATENT OFFICE.

BYRON FORBES, OF MIAMI, ARIZONA.

BELT CONVEYER.

Application filed May 29, 1922. Serial No. 564,367.

*To all whom it may concern:*

Be it known that I, BYRON FORBES, of Miami, county of Gila, State of Arizona, have invented certain new and useful Improvements in Belt Conveyers, of which the following is a specification.

This invention relates to improvements in the art of transporting or conveying ores, minerals, sand, gravel, coal, coke and other materials that are dry or relatively dry, by means of apparatus generally known as belt conveyers. The general practice in construction of belt conveyers has been to bolt both the carrier and troughing idlers and the return idlers to a rigid platform or in other ways to fix, more or less permanently, the positions of these idlers. As a result of this practice, conveyer belts, for a number of reasons which need not be dwelt upon here, do not run in the straight true line that is greatly to be desired, but creep sidewise or "run off". It has been the general practice to limit the "running off" of the belts by placing special idlers, called guide idlers, in fixed positions at intervals along both sides of the conveyer belt so that after a certain amount of running off has taken place, the edge of the conveyer belt comes into contact with the pulley of the fixed guide idler and any further running off of the belt in that direction is prevented. This practice does not correct the tendency of the belt to run off. It merely prevents the belt from going any further after it has run off a certain distance. Often times a considerable pressure is exerted between the edges of the belt and the fixed guide idlers. As a result, the edges of the belt become badly worn and frayed and there is a seperation between the plies of the belt along the edges. Quite often these frayed edges catch and a considerable portion of the length of the belt is torn. Thus the value of the conveyer belt is considerably reduced or the belt made valueless by the continual tendency of the conveyer belt to run off.

The present invention relates to an automatic device by means of which the running off of the conveyer belt is controlled and the belt is caused to run continuously in a straight line.

The principle of this invention lies in so supporting a set of conveyer idlers, either carrier, troughing or return idlers, that these idlers are free to turn in the arc of a circle about a pivotal pin or bolt, which is fixed. By means of any suitable arrangement by which the pressure exerted by the edge of the belt (when the belt is running off) against an object in its path, can be transmitted to this movable set of idlers, the running off of the belt can be automatically controlled since this pressure, when transmitted to the movable idlers, causes them to assume a position which automatically corrects the running off of the belt. It is clear, therefore, that in this invention automatic control for aligning the belt or correction of the running off of the belt is dependent on the actual running off of the belt.

My invention is illustrated in the accompanying drawings, in which Fig. 1 is a plan view of a belt conveyer, partly broken away. Fig. 2 is a plan view of an aligning device therefor. Fig. 3 is a front view of said device. Fig. 4 is a section on line 4—4 in Fig. 3.

The conveyer belt 1, as shown in Fig. 1, is supported by any desired number of sets of idlers, including fixed or rigidly mounted idler sets 2, and automatically movable idler sets 3, all mounted on a suitable frame or supporting means 4. In Fig. 1 only the upper or load carrying portion of the belt is shown, it being understood that a similar arrangement may be presented for the return portion of the belt. The fixed or rigidly mounted idler sets 2 may be of any usual or suitable construction. The self aligning idler sets may be of the construction shown in Figs. 2 to 4 and described as follows:

A standard set of conveyer idlers 5 and 15 of proper size for any particular size of conveyer belt, is rigidly attached to a plate or platform 6. Leverage arms 7 and 7' and guide idlers 8 and 8' are also rigidly attached to plate 6, these leverage arms and guide idlers being capable of adjustment on plate 6 by means of slotted bolt holes 9 in said plate 6 and bolts 10 engaging in said holes. Plate 6 and the conveyer idlers 5, leverage arms 7 and 7' and guide idlers 8 and 8' carried thereby are free to turn in the arc of a circle about a pivot or king bolt 11 mounted on a base plate 12, which is rigidly attached to the conveyer frame work or housing represented at 4, a pivotal mounting of the plate or platform 6, being such that the said platform and the parts carried thereby are free to swing laterally in a plane substantially parallel to the direction of travel of the conveyer belt. Movable rollers 14 and 14' are rigidly attached to the bottom of plate 6 and run on base plate 12 so that the weight of the conveyer idlers, leverage arms, guide idlers and the belt, with its load of ore or other material, is supported by said base plate, the shafts of said rollers being radial with respect to king pin 11 to permit free rotation of the idler platform around said king pin. The conveyer belt, with the load of ore or other material, runs between the guide idlers 8 and 8' and the belt and load is supported on either side of the aligning or controlling idler by other standard idlers 2, mounted as in general practice and spaced at proper intervals to carry the weight of the belt and load. By means of the adjustment of the leverage arms and guide idlers on plate 6, the guide idlers on the aligning idler means are so set that there is a clearance of say, about one half inch between the edges of the conveyer belt and the pulleys of the guide idlers 8 and 8' when the conveyer belt is running in its true course. In placing the aligning idler the leverage arms extend from the plate 6 in a direction opposite to the direction of the travel of the belt, indicated by the arrow.

The following is a brief description of the operation of this apparatus in controlling or correcting the running off of the conveyer belt. When the belt is traveling in its true course, that is, in a straight line, the axial line of the aligning conveyer idlers is at right angles to the line of travel of the belt and neither guide idler 8 or 8' is in contact with the edge of the belt. As the belt runs off to either side, the edge of the belt on that side comes into contact with the corresponding guide idler 8 or 8'. The pressure of the belt against the guide idler 8 or 8', transmitted through the leverage arm 7 or 7', causes a movement of plate 6 and the aligning idlers about the pivotal bolt, 11, thus increasing the angle between the axial line of the aligning idlers and the true line of travel of the belt to an angle greater than 90° on the side toward which the belt is running off. This angular position of the aligning idlers returns the belt to its true course and corrects the running off of the belt. The greater the pressure between the edge of the belt and the guide idlers, that is, the greater the tendency the belt has to run off, the greater the movement of the aligning idlers about the pivotal bolt.

In practical operation I have found that it is not necessary that all of the idlers on a belt conveyer be of the aligning type. I have found that the running off of a conveyer belt 36 inches wide and several hundred feet in length can be perfectly controlled by using one aligning idler set every 30 to 50 feet along the length of the belt, fixed or stationary idler-means being provided at suitable intervals and in suitable numbers between the successive self-aligning idlers. Thus, as shown in Fig. 1, I will generally use a multiplicity of fixed stationary idlers distributed along the belt between successive self-aligning idlers. Furthermore the self-aligning idler means are distributed at suitable intervals along the length of the belt and the stationary idler means are distributed along the belt between successive self-aligning idler means, and such distribution of idler means may be provided on the return portion of the belt, as well as on the load carrying portion thereof.

In carrying out this invention, use may be made of any of the so-called standard makes of conveyer idlers. I do not confine myself to any particular type of conveyer idler, nor to the particular apparatus described, for carrying out my invention. The conveyer idlers, however, are in any case generally so constructed as to support the belt in the form of a trough, this being effected in the form shown in the drawing by horizontal idler rollers 5 directly beneath the belt, and the inclined idler rollers 15 at each side. In the above described operation the belt supporting idler means are carried by the member 6 in such manner as to be laterally movable in respect to the line or axis of motion of the belt, such lateral movement taking place about the axis which lies in the central line of movement of the belt, or the axis of motion of the belt, the effect of this operation being to restore the belt to alignment along this central line of motion.

What I claim is:

1. In combination with a conveyer belt a plurality of self aligning idler means distributed along the length of the belt, each of said self aligning idler means being pivotally mounted to enable it to swing laterally of the belt and being provided with belt supporting idler rolls and with means adapted to engage the respective edges of the belt to swing the idler means so as to cause the belt to be aligned by operation of the belt supporting idler rolls, and fixed idler means distributed along the conveyer belt and interposed between the said self-aligning idler means.

2. In combination with a conveyer belt a plurality of fixed idler means distributed along the length of the belt and a plurality of self aligning movably mounted idler means distributed along the length of the belt, there being a multiplicity of fixed idler means between successive self-aligning idler means, said self aligning idler means being pivotally mounted to swing laterally of the belt and being provided with belt supporting idler rolls and with means engaging with the respective edges of the belt to swing the idler means laterally so as to align the belt by the operation of the belt on the belt supporting idler rolls.

3. A self-aligning belt supporting idler means comprising a fixed support, an idler frame pivotally mounted on said fixed support to swing in a plane substantially parallel to the direction of travel of the belt, idler rolls on said idler frame mounted to turn on a horizontal axis and adapted to support the conveyer belt; idler rolls each mounted to turn on an inclined axis and carried by said idler frame and adapted to engage the edge portions of the conveyer belt to trough the belt and rolls connected to said idler frame and adapted to engage the edge of the belt to swing the idler supporting means laterally with respect to the belt so as to effect alignmenet of the belt by operation of the belt on the said belt supporting idler rolls and antifriction rolls mounted on said frame and running on said fixed support to support the idler frame while permitting its swinging movement.

4. In combination with a conveyer belt, a plurality of self-aligning idler means distributed along the load carrying portion of the conveyer belt and a plurality of self-aligning idler means distributed along the return portion of the conveyer belt, each of the said self-aligning idler means being pivotally mounted to enable it to swing laterally to the belt and being provided with belt supporting idler rolls and with means adapted to engage the respective edges of the belt to swing the idler means so as to cause the belt to be aligned by operation of the belt supporting idler rolls, and fixed idler means provided with belt supporting idler rolls distributed along both the load carrying portion and the return portion of the conveyer belt between successive self-aligning idler means.

In testimony whereof I have hereunto subscribed my name this 15th day of May 1922.

BYRON FORBES.